United States Patent
Jacobs et al.

(10) Patent No.: US 10,678,722 B2
(45) Date of Patent: *Jun. 9, 2020

(54) USING A DECREMENTER INTERRUPT TO START LONG-RUNNING HARDWARE OPERATIONS BEFORE THE END OF A SHARED PROCESSOR DISPATCH CYCLE

(71) Applicant: International Business Machines Corporation, Armonk, NY (US)

(72) Inventors: Stuart Z. Jacobs, Lakeville, MN (US); David A. Larson, Rochester, MN (US); Michael J. Vance, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 607 days.

This patent is subject to a terminal disclaimer.

(21) Appl. No.: 15/371,090

(22) Filed: Dec. 6, 2016

(65) Prior Publication Data
US 2017/0083462 A1    Mar. 23, 2017

Related U.S. Application Data

(63) Continuation of application No. 14/444,456, filed on Jul. 28, 2014, now Pat. No. 9,535,846.

(51) Int. Cl.
*G06F 9/30*     (2018.01)
*G06F 9/455*    (2018.01)
(Continued)

(52) U.S. Cl.
CPC .......... *G06F 13/24* (2013.01); *G06F 9/30054* (2013.01); *G06F 9/45558* (2013.01); *G06F 12/084* (2013.01); *G06F 12/0842* (2013.01); *G06F 12/0862* (2013.01); *G06F 12/0875* (2013.01); *G06F 2009/45579* (2013.01);
(Continued)

(58) Field of Classification Search
CPC .. G06F 13/24; G06F 9/30054; G06F 9/45558; G06F 12/084; G06F 12/0842; G06F 12/0862; G06F 12/0875; G06F 2009/45579; G06F 2212/1024;
(Continued)

(56) References Cited

U.S. PATENT DOCUMENTS

| | | |
|---|---|---|
| 6,421,702 B1 | 7/2002 | Gulick |
| 6,993,640 B2 | 1/2006 | Doing et al. |

(Continued)

OTHER PUBLICATIONS

IBM "List of IBM Patents or Patent Applications Treated As Related".

(Continued)

*Primary Examiner* — Emerson C Puente
*Assistant Examiner* — Jonathan R Labud
(74) *Attorney, Agent, or Firm* — Patterson + Sheridan, LLP

(57) ABSTRACT

Systems, methods, and computer program products to perform an operation comprising processing a first logical partition on a shared processor for the duration of a dispatch cycle, issuing, by a hypervisor, at a predefined time prior to completion of the dispatch cycle, a lightweight hypervisor decrementer (HDEC) interrupt, and responsive to the lightweight HDEC interrupt, initiating an asynchronous hardware operation on the shared processor prior to completion of the dispatch cycle.

14 Claims, 4 Drawing Sheets

(51) Int. Cl.
*G06F 12/084* (2016.01)
*G06F 12/0842* (2016.01)
*G06F 12/0862* (2016.01)
*G06F 12/0875* (2016.01)
*G06F 13/24* (2006.01)

(52) U.S. Cl.
CPC ............ *G06F 2212/1024* (2013.01); *G06F 2212/152* (2013.01); *G06F 2212/2022* (2013.01); *G06F 2212/2024* (2013.01); *G06F 2212/452* (2013.01)

(58) Field of Classification Search
CPC ....... G06F 2212/152; G06F 2212/2022; G06F 2212/2024; G06F 2212/452
See application file for complete search history.

(56) References Cited

U.S. PATENT DOCUMENTS

| | | | |
|---|---|---|---|
| 7,356,817 B1 | 4/2008 | Cota-Robles et al. | |
| 7,840,962 B2 | 11/2010 | Neiger et al. | |
| 8,219,995 B2 | 7/2012 | Flemming et al. | |
| 9,448,945 B2 | 9/2016 | Jacobs et al. | |
| 2002/0083253 A1* | 6/2002 | Leijten | G06F 9/30116 710/260 |
| 2008/0244568 A1* | 10/2008 | Flemming | G06F 9/45541 718/1 |
| 2013/0339948 A1* | 12/2013 | Gassert | G06F 9/45558 718/1 |
| 2016/0026573 A1 | 1/2016 | Jacobs et al. | |
| 2016/0026586 A1 | 1/2016 | Jacobs et al. | |

OTHER PUBLICATIONS

Armstrong et al., Advanced virtualization capabilities of POWER5 systems [online] (2005). IEEE, pp. 523-532. <http://ieeexplore.ieee.org/stamp/stamp.jsp?tp=&arnumber=5388809*>.

Gibbs et al., "Advanced POWER Virtualization on IBM eserver p5 Servers: Architecture and Performance Considerations", [online] (Nov. 2005), IBM, pp. 1-412. <http://student.ing-steen.se/unix/aix/redbooks/sg245768.pdf>.

Mack et al., "IBM POWER6 reliability", [online] (2007). IEEE, pp. 763-774. <http://ieeexplore.ieee.org/stamp.stamp.jsp?tp=&arnumber=5388629>.

* cited by examiner

USING A DECREMENTER INTERRUPT TO START LONG-RUNNING HARDWARE OPERATIONS BEFORE THE END OF A SHARED PROCESSOR DISPATCH CYCLE

CROSS-REFERENCE TO RELATED APPLICATIONS

This application is a continuation of co-pending U.S. patent application Ser. No. 14/444,456, filed Jul. 28, 2014. The aforementioned related patent application is herein incorporated by reference in its entirety.

BACKGROUND

The present disclosure relates to computer processors, and more specifically, to using a decrementer interrupt to start long-running hardware operations before the end of a shared processor dispatch cycle.

Shared processors may be time-sliced to allow multiple partitions to run periodically. Such sharing may be referred to as "micro-partitioning." Whenever a partition is dispatched to a physical processor, that partition may execute for a set amount of time (referred to as a "dispatch cycle"). Different hardware operations may need to be completed between dispatch cycles. While these hardware operations execute, the shared processor (and other system resources) are not used by partitions, meaning system resources go unused by the logical partitions during the hardware operations.

SUMMARY

Embodiments disclosed herein include, without limitation, a system, method, and computer program product to perform an operation comprising processing a first logical partition on a shared processor for the duration of a dispatch cycle, issuing, by a hypervisor, at a predefined time prior to completion of the dispatch cycle, a lightweight hypervisor decrementer (HDEC) interrupt, and responsive to the lightweight HDEC interrupt, initiating an asynchronous hardware operation on the shared processor prior to completion of the dispatch cycle.

DETAILED DESCRIPTION

Figure 1:
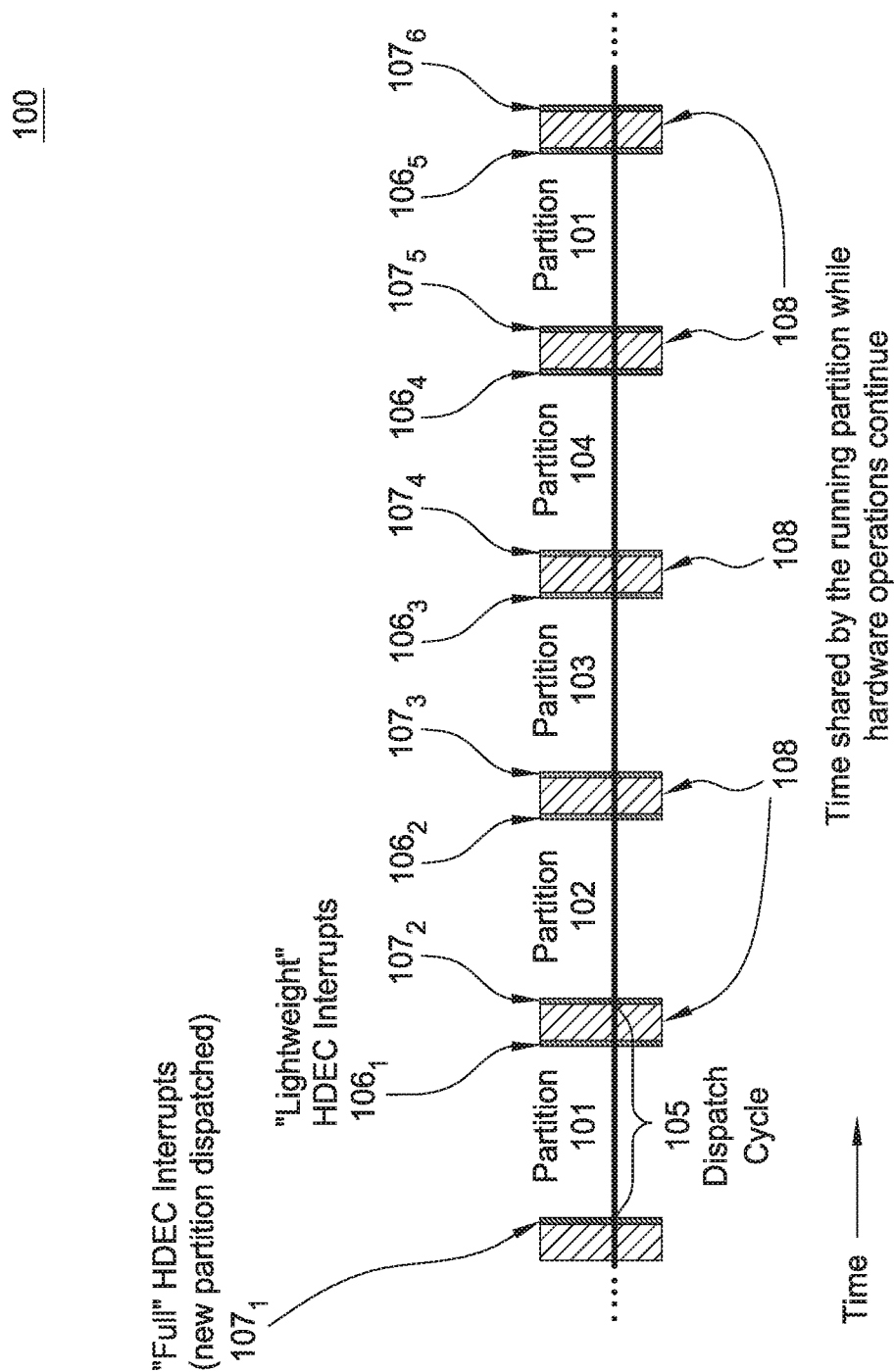
FIG. 1 illustrates techniques to use a decrementer interrupt to start long-running hardware operations before the end of a shared processor dispatch cycle, according to one embodiment.

Embodiments disclosed herein use lightweight hypervisor decrementer (HDEC) interrupts to initiate asynchronous hardware operations prior to completing a dispatch cycle for a logical partition (or virtual machine) executing on a shared processor. In doing so, the hardware operations may be performed in parallel with the dispatch cycle of the logical partitions, such that the hypervisor need not wait for the hardware operations to complete after the dispatch cycle of the current logical partition ends to start the dispatch cycle of the next logical partition. Furthermore, embodiments disclosed herein compute an expected (or predicted) amount of time required to complete the hardware operation, based on historical times to complete similar operations and how often the similar operations complete prior to or subsequent to the end of the dispatch cycle for a given logical partition. In estimating how long the hardware operation will take to complete, the hypervisor managing the shared resources can be modified to initiate the hardware operation such that the hardware operation completes prior to the end of the current dispatch cycle. For example, hardware operation X may need to be completed for each dispatch cycle. If the hypervisor determines that the hardware operation X will take one hundred microseconds to complete, the hypervisor may issue a lightweight HDEC interrupt one hundred microseconds prior to the end of the current dispatch cycle, allowing the hypervisor to initiate the hardware operation X. Performing the operations in parallel with the dispatch cycles improves system resource utilization.

As used herein, a "full HDEC interrupt" refers to a hypervisor decrementer interrupt that initiates, without limitation, operations to determine whether or not to relinquish a logical partition's control of a processor. A full HDEC interrupt may also initiate hardware operations. As used herein, a "lightweight HDEC interrupt" refers to a hypervisor decrementer interrupt that initiates long running hardware operations in a processor. Therefore, a lightweight HDEC interrupt may be viewed as triggering a subset of the operations that may be initiated by a full HDEC interrupt.

One example of an asynchronous hardware operation includes a "micropartition prefetch." Memory caches of the processor are shared amongst all partitions running on the processor. As such, partitions compete for cache resources, which may result in cache thrashing. This problem may be exacerbated by many partitions sharing the same processor resource. Micropartition prefetch allows micro-partitions to reduce cache miss latency. At the end of a partition's dispatch cycle, the processor may log the addresses of cache lines used by the partition to a memory buffer in the virtual processor. When the partition is dispatched again, those cache lines are restored to prevent cache misses early in the dispatch cycle.

Micropartition prefetch, however, relies on the addresses of the cache lines being logged quickly, as the next partition cannot run until all addresses of the cache lines are logged or else the recorded addresses will be inaccurate. If the time to log the addresses is too great, the partition may overrun its dispatch cycle, and waste processor cycles which could be used for useful work. Therefore, logging the addresses of the cache lines used by the partition is an example hardware operation that may be triggered by a lightweight HDEC prior to completion of the current dispatch cycle. Generally, the hypervisor may compute an estimated amount of time required to log the addresses. The estimated amount of time may be based on prior amounts of time required to log the addresses. The estimated amount of time may be modified by a fractional amount of the logging process, based on whether or not the hypervisor previously stalled waiting for the logging process to complete (after the current dispatch cycle ends). Therefore, if the hypervisor determines that the next logging process may take 50 microseconds to complete, the hypervisor may issue the lightweight HDEC 50 microseconds prior to the completion of the current dispatch cycle, causing the logging to be completed during the current dispatch cycle of the logical partition.

While logging addresses of cache lines is used herein as a reference example of an asynchronous hardware operation, embodiments presented herein may be adapted for use with other hardware operations that may be performed prior to the completion of a dispatch cycle.

FIG. 1 is a schematic 100 illustrating techniques to use a decrementer interrupt to start long-running hardware operations before the end of a shared processor dispatch cycle, according to one embodiment. Generally, the schematic 100 reflects a shared processor sharing processing time equally and periodically between different micropartitions (also referred to as partitions, or virtual machines) over time. As shown, the partitions 101-104 may execute for a dispatch cycle 105. The different dispatch cycles 105 may be equal, such that each partition 101-104 executes for the same amount of time, or the dispatch cycles 105 may be of different lengths, such that each partition 101-104 executes for different amounts of time.

Whenever a dispatch cycle 105 ends, a hypervisor managing the shared processor may issue a hypervisor decrementer (HDEC) interrupt $107_{1-6}$, which may include operations to determine whether or not to relinquish the partition's control of the processor. If a result of the operations determines the partition's control of the processor should be relinquished, a new partition may be dispatched to the processor. For example, partition 101 is dispatched when the hypervisor issues interrupt $107_1$, while partition 102 is dispatched when the hypervisor issues interrupt $107_2$, and so on. In addition, the hypervisor is configured to trigger hardware operations by issuing a lightweight hypervisor decrementer (HDEC) interrupt $106_{1-6}$ prior to the end of the current dispatch cycle 105. Generally, the hypervisor may determine how long the hardware operation may take to complete, and trigger the interrupt with enough time such that the hardware operation may complete prior to (or roughly contemporaneously with) the end of the current dispatch cycle 105. Doing so allows the logical partitions 101-104 to continue to run while the hardware operations are performed, minimizing the amount of down time previously required to complete the hardware operations in between dispatch cycles 105. As shown, the hardware operations and logical partitions share an amount of time 108, where the partitions 101-104 run while the hardware operations continue.

Generally, the hypervisor must determine when the lightweight HDEC interrupts should occur. There is a delicate balance between starting hardware operations too early, and starting them too late. If hardware operations are started too early, the full benefit of the operation may not be realized. In the case of micropartition prefetch, e.g., some cache lines used at the end of the dispatch cycle may be missed. If the hardware operations are started too late, the hypervisor must wait for the operations to complete before dispatching the next partition, wasting processor cycles.

Additionally, hardware operation durations may vary from dispatch to dispatch. This floating target introduces some complexity to the algorithms necessary to plan lightweight HDECs at the most opportune time. In order to address this issue, embodiments disclosed herein maintain a running history of the last n hardware operation durations, and average the history of durations in order to smooth the jitter associated with workload and hardware variations. In order to optimize these averaged times, embodiments disclosed herein may add or subtract a fractional time of the hardware operation from the average time, depending on how frequently the hypervisor stalls waiting for operations to complete. For example, if the number of times the hypervisor stalls exceeds a predefined threshold, the fractional time may be added to provide additional time for the hardware operation to complete. If the number of times the hypervisor does not stall waiting for the hardware operation to complete exceeds a specified threshold (i.e., the hardware operation consistently completes prior to the end of the dispatch cycle), the fractional time may be subtracted from the average time.

Figure 2:
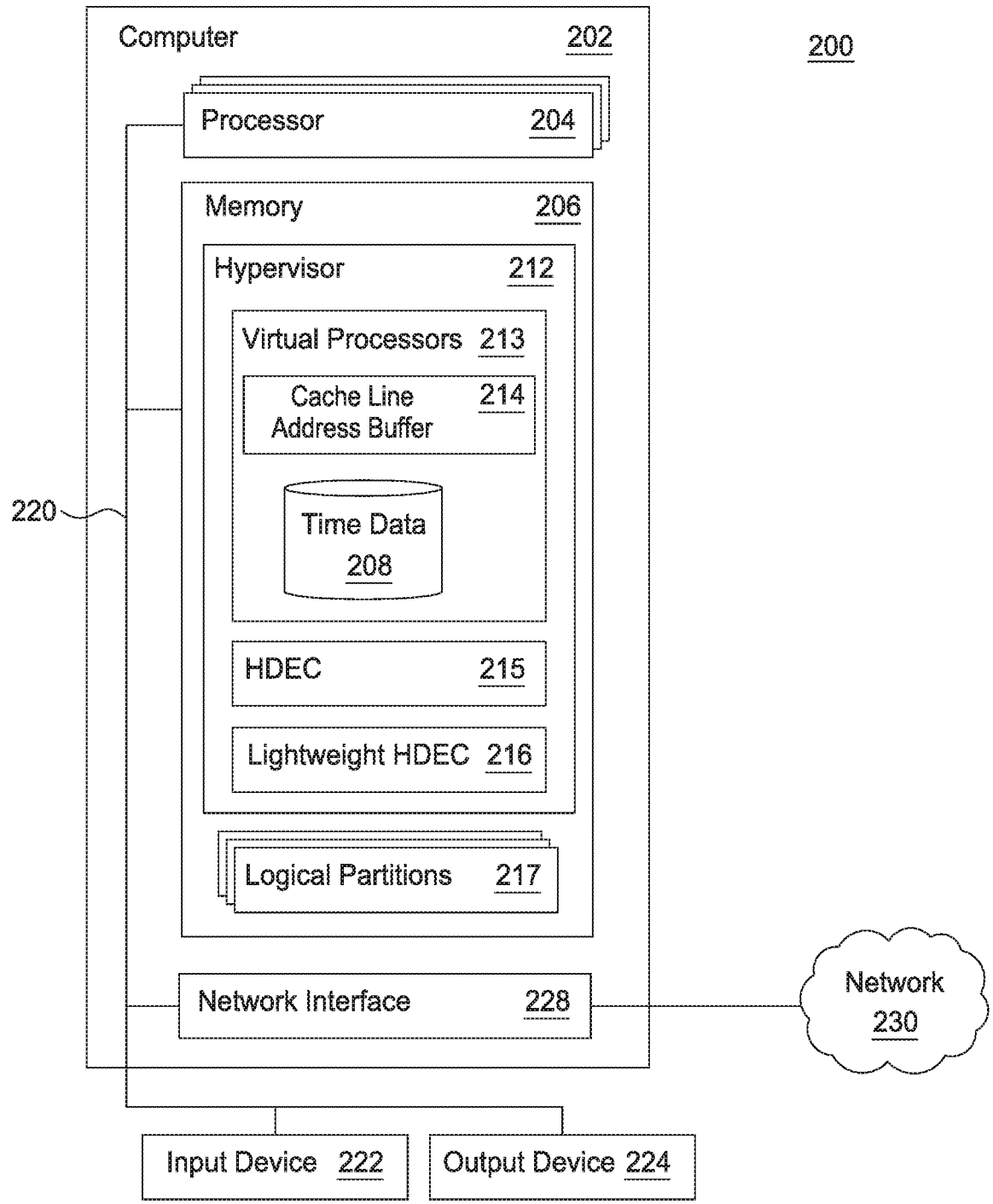
FIG. 2 illustrates a system to use a decrementer interrupt to start long-running hardware operations before the end of a shared processor dispatch cycle, according to one embodiment.

FIG. 2 illustrates a networked system 200 which uses a decrementer interrupt to start long-running hardware operations before the end of a shared processor dispatch cycle, according to one embodiment. The networked system 200 includes a computer 202. The computer 202 generally includes one or more processors 204 connected via a bus 220 to a memory 206, a network interface device 228, an input device 222, and an output device 224. The processor 204 is included to be representative of a single CPU, multiple CPUs, a single CPU having multiple processing cores, and the like. Generally, the processor 204 includes any processing element any processing element capable of performing the functions described here. One example of the processor 204 is the POWER8 processor by the International Business Machines Corporation.

The memory 206 may include a variety of computer readable media selected for relative performance or other capabilities: volatile and/or non-volatile media, removable and/or non-removable media, etc. Memory 206 may include cache, random access memory (RAM), storage, etc. Memory 206 may include one or more discrete memory modules, such as dynamic RAM (DRAM) dual inline memory modules (DIMMs). Of course, various memory chips, bandwidths, and form factors may alternately be selected. Storage may typically provide a non-volatile memory for the computer 202, and may include one or more different storage elements such as flash memory, a hard disk drive, a solid state drive, an optical storage device, and/or a magnetic storage device.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used. The network interface device 218 may be any type of network communications device allowing the computer 202 to communicate with other computers via a network 230. In general, the network 230 may be a telecommunications network and/or a wide area network (WAN). In a particular embodiment, the network 230 is the Internet.

As shown, the memory includes a hypervisor 212, which is an application generally configured to actively manage the distribution and utilization of virtualized hardware resources to one or more logical partitions 217. The hypervisor 212 may be included as part of the computer 202, as shown, or may be a separate networked computing device. The hypervisor 212 is an example of firmware, or an operating system, of the computer 202. The hypervisor 212 abstracts hardware resources, such as the processor 204 and memory 206, from the logical partitions 217. The hypervisor 212 may generally create, manage, and schedule the dispatching of virtual processors 213 for each of the logical partitions 217. The virtual processors 213 are generally a representation of a physical processor core to the operating system of a logical partition 217 that uses shared processors.

The logical partitions 217 (also referred to as virtual machines) are instances of operating systems executing on the computer 202. Examples of operating systems include the AIX operating system, versions of the Microsoft Windows operating system, and distributions of the Linux operating system. (Microsoft and Windows are trademarks of Microsoft Corporation in the United States, other countries, or both. Linux is a registered trademark of Linus Torvalds in the United States, other countries, or both.). The logical partitions 217 may further execute any type of application (not shown).

The hypervisor 212 shares the processors 204 to allow the logical partitions 217 to run periodically. Whenever a logical partition 217 is dispatched to a shared processor 204, the logical partition 217 executes for a set amount of time, known as the dispatch cycle. In order to regain control of the processor 204 from a logical partition 217, the hypervisor 212 may issue a hypervisor decrementer (HDEC) interrupt 215. The HDEC 215 is programmed to interrupt the logical partition 217 when its dispatch cycle is complete. An interrupt is generally a signal to the processor 204 emitted by hardware or software indicating an event that needs immediate attention. The hypervisor 212 is further configured to issue a lightweight HDEC interrupt 216 to trigger hardware operations in the processors 204. Generally, the hardware operations may be any type of hardware operation, such as logging addresses of cache lines used by the logical partition 217 during its dispatch cycle, such that portions of memory 206 used by the logical partition 217 may be restored in subsequent dispatch cycles for that logical partition 217. The hypervisor 212 may issue the lightweight HDEC interrupt 216 at a time prior to the completion of the dispatch cycle of the current logical partition 217.

The hypervisor 212 may determine this time by referencing previous times to complete the hardware operation stored in the time data 208 of the virtual processor 213. The time data 208 generally includes attributes regarding prior hardware operations, such as the type of hardware operation, the amount of time required to complete the hardware operation, workload statistics, the hardware configurations, and an indication of whether the hardware operation completed prior to the end of its concurrent dispatch cycle. The hypervisor 212 may average the times in the time data 208 (related to the current hardware operation) to determine, on average, how long the current hardware operation takes to complete. The hypervisor 212 may then adjust the average time by adding or subtracting a fractional time of the hardware operation depending on how frequently the prior hardware operations completed after or prior to completion of the dispatch cycle, respectively. For example, if the number of times the hardware operation completed after the end of the dispatch cycle (and the hypervisor 212 therefore stalls waiting for the hardware operation to complete) exceeds a predefined threshold, the hypervisor 212 may add time to the average time in order to ensure that the hardware operation completes prior to the end of the dispatch cycle. Similarly, if the number of times the hardware operation completed prior to the end of the dispatch cycle exceeds a specified threshold, the hypervisor 212 may subtract time from the average time.

Once the hypervisor 212 determines an estimated amount of time to complete the hardware operation, the hypervisor 212 may trigger the lightweight HDEC 216 at the same amount of time prior to the completion of the current dispatch cycle. For example, if the hypervisor 212 determines that the hardware operation take one hundred microseconds to complete, the hypervisor 212 may issue the lightweight HDEC interrupt 216 one hundred microseconds prior to the completion of the dispatch cycle. Once the hardware operation completes, the hypervisor 212 logs metrics related to the hardware operation (such as time to completion, hardware configurations, operation type, and the like) in the time data 208. Doing so allows the hypervisor 212 to improve the estimated time to completion for subsequent hardware operations (and therefore more accurately issue the lightweight HDEC interrupt 216).

As shown, the virtual processors 213 also include a cache line address buffer 214. The cache line address buffer 214 is a data store holding addresses of cache lines the logical partitions 217 use during execution. When the hypervisor 212 issues the lightweight HDEC 216 to the processor 204 (which includes a location of the cache line address buffer 214), the processor 204 may write the cache lines addresses pointing to areas in the memory 206 (which may include L2 and L3 cache) used by the logical partitions 217 during processing.

Figure 3:
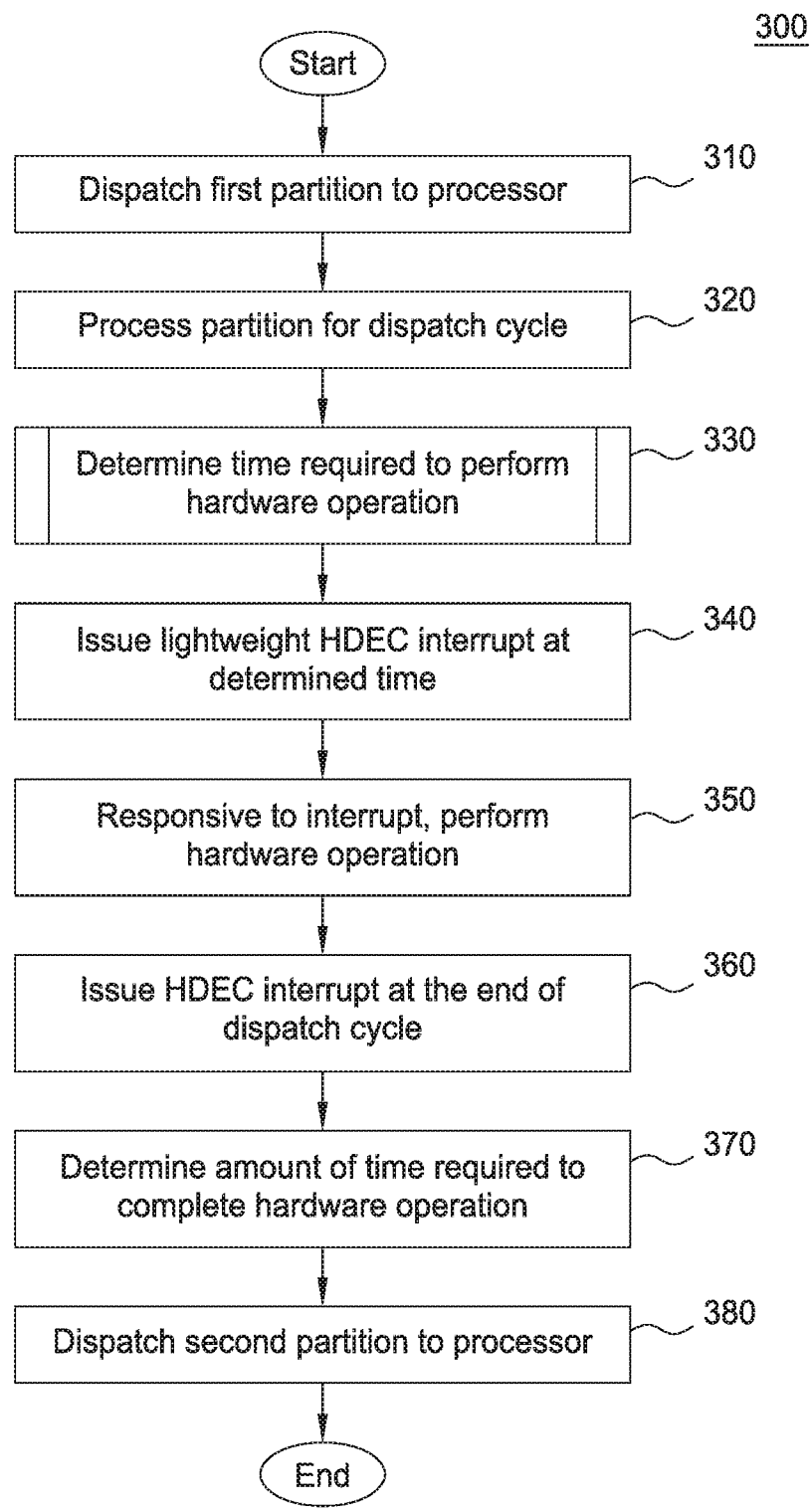
FIG. 3 illustrates a method to use a decrementer interrupt to start long-running hardware operations before the end of a shared processor dispatch cycle, according to one embodiment.

FIG. 3 illustrates a method 300 to use a decrementer interrupt to start long-running hardware operations before the end of a shared processor dispatch cycle, according to one embodiment. The steps of the method 300 are discussed using logging addresses of cache lines as a reference example of a hardware operation.

At step 310, the hypervisor 212 may dispatch a first logical partition 217 to a processor 204. At step 320, the processor 204 may execute the first logical partition 217 for the duration of a dispatch cycle. At step 330, the hypervisor 212 may determine an estimated amount of time required to perform a hardware operation, such that the hypervisor 212 can issues a lightweight HDEC interrupt 216, prior to the end of the dispatch cycle, to perform the hardware operation. As described in greater detail with reference to FIG. 4, the hypervisor 212 generally relies on the times of prior hardware operations to determine when to issue the lightweight HDEC interrupt 216. One example of a hardware operation is logging cache line addresses used by the first logical partition 217 during its dispatch cycle to the cache line address buffer 214. At step 340, the hypervisor 212 issues the lightweight HDEC interrupt 216 at a time sufficient to complete the hardware operation having an estimated time of completion determined at step 330. At step 350, the hardware performs the operation responsive to the lightweight HDEC interrupt 216. For example, the processor 204 may begin logging the cache line addresses used by the first logical partition 217 to the cache line address buffer 214. At step 360, the hypervisor 212 may issue an HDEC interrupt 215 at the end of the dispatch cycle (and completion of the hardware operation) to transfer control of the processor 204 to the hypervisor 212. At step 370, the hypervisor 212 may determine an amount of time required to complete the hardware operation. The hypervisor 212 may store this information in the time data 208. At step 380, the hypervisor 212 may dispatch a second logical partition 217 to the processor 204.

Figure 4:
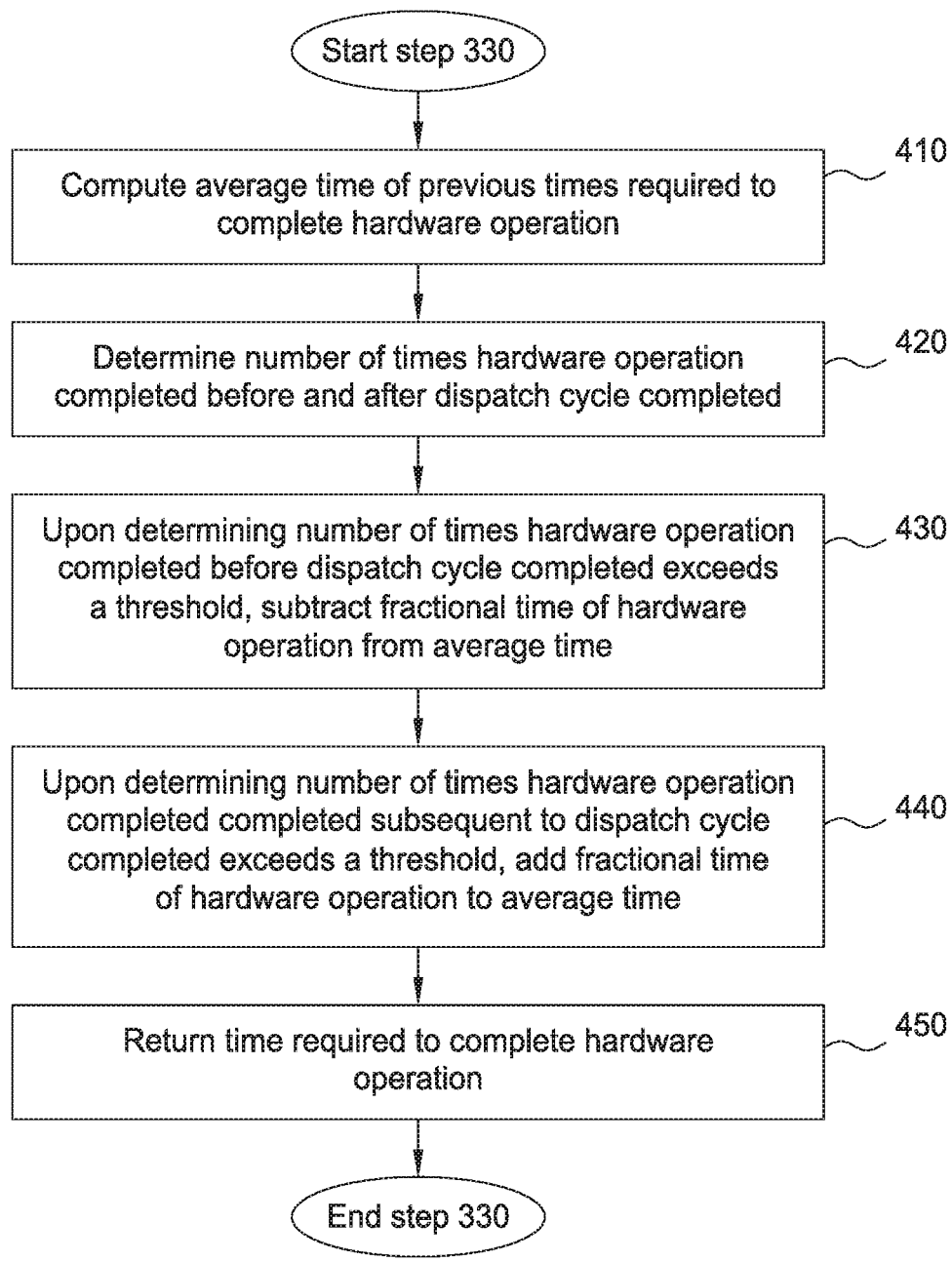
FIG. 4 illustrates a method to determine a time required to perform a hardware operation, according to one embodiment.

FIG. 4 illustrates a method 400 corresponding to step 330 to determine when to perform a hardware operation, according to one embodiment. Generally, the hypervisor 212 may perform the steps of the method 400 to compute an amount of time required to perform a hardware operation, such that the hypervisor 212 may issue the lightweight HDEC interrupt 216 with enough time to complete the hardware operation prior to the end of the current dispatch cycle.

At step 410, the hypervisor 212 may average the previous time periods required to complete the hardware operation. The hypervisor 212 will use this computed time to trigger, via a new lightweight HDEC interrupt 216, the hardware operation. For example, if the hardware operation is logging cache line addresses, the hypervisor 212 may reference the time data 208 in order to determine how long previous operations took to log cache line addresses took. The hypervisor 212 may determine an average time for the cache line address logging from the time data 208. At step 420, the hypervisor 212 may determine the number of times the hardware operations previously completed before and/or after the concurrent dispatch cycle completed. For example, by referencing the time data 208, the hypervisor 212 may determine how many times cache line address logging completed prior to or after the dispatch cycle finished. Generally, at step 420, the hypervisor 212 determines how often the hypervisor 212 previously stalled waiting for a hardware operation completed, such that the hypervisor 212 may adjust the average time in order to better ensure that the hardware operation completes prior to the end of the current dispatch cycle.

At step 430, the hypervisor 212 may, upon determining that the number of times the hardware operation completed before the dispatch cycle completed exceeds a threshold, subtract a fractional time of the hardware operation to the average time computed at step 410. For example, if the threshold is 10 times, and the hardware operation completed prior to the end of the dispatch cycle 20 times (in the past n operations), the hypervisor 212 may reduce the average time, allowing the hardware operation to start closer towards the end of the dispatch cycle. At step 440, the hypervisor 212 may, upon determining that the number of times the hardware operation completed after the dispatch cycle completed exceeds a threshold, add a fractional time of the hardware operation to the average time computed at step 410. For example, if the threshold is 10 times, and the hardware operation completed after the dispatch cycle completed 20 times (in the past n operations), the hypervisor 212 may add time to the average time, allowing the hardware operation to start further from the end of the dispatch cycle. Although counts and threshold numbers are described, any suitable methodology may be able to determine whether the hypervisor 212 repeatedly stalls waiting for the hardware operation to complete after the dispatch cycle completes. For example, the thresholds may be a percentage of prior hardware operations, such as 50%. At step 450, the hypervisor 212 may return the time required to complete the hardware operation, such that the hypervisor 212 can issue the lightweight HDEC interrupt 216 at a time that better ensures that the hardware operation will complete prior to the end of the current dispatch cycle.

Advantageously, embodiments disclosed herein trigger asynchronous hardware operations during the dispatch cycle of a logical partition on a shared processor. Embodiments disclosed herein compute an expected time to complete the operation, based on historical amounts of time required to complete similar hardware operations. As the end of the dispatch cycle nears, embodiments disclosed herein may issue a lightweight HDEC interrupt to trigger the hardware operation such that the hardware operation completes prior to the end of the current dispatch cycle.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the hypervisor 212 could execute on a computing system in the cloud and issue lightweight HDEC interrupts to trigger asynchronous hardware operations during processing of a logical partition on a shared processor. In such a case, the hypervisor 212 could compute the amount of time required to complete the hardware operation, and store the amount of time at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   processing a first logical partition on a shared processor for the duration of a dispatch cycle for the first logical partition;
   issuing, by a hypervisor, at a predefined time prior to completion of the dispatch cycle for the first logical partition, a lightweight hypervisor decrementer (HDEC) interrupt;
   responsive to the lightweight HDEC interrupt, initiating an asynchronous hardware operation on the shared processor prior to completion of the dispatch cycle for the first logical partition;
   averaging amounts of time required to perform the asynchronous hardware operation for each of a plurality of logical partitions, to determine an average amount of time; and
   setting the average amount of time as the predefined time to issue the lightweight HDEC during the processing of the first logical partition.

2. The method of claim 1, further comprising:
   upon determining that a count of times the shared processor completes the asynchronous hardware operation prior to the completion of each respective dispatch cycle exceeds a predefined threshold, subtracting a fractional amount of time from the predefined time to cause the lightweight interrupt to be issued closer to the end of the dispatch cycle for the first logical partition.

3. The method of claim 1, further comprising:
   upon determining that a count of times the shared processor completes the asynchronous hardware operation after the completion of each respective dispatch cycle exceeds a predefined threshold, adding a fractional amount of time to the predefined time to cause the lightweight interrupt to be issued occur further from the end of the dispatch cycle for the first logical partition.

4. The method of claim 1, further comprising:
upon completion of the dispatch cycle for the first logical partition, issuing, by the hypervisor, a hypervisor decrementer (HDEC) interrupt that causes a second logical partition to be processed by the shared processor for the duration of a next dispatch cycle.

5. The method of claim 1, wherein the asynchronous hardware operation is performed in order to facilitate a subsequent micropartition prefetch process by the first logical partition.

6. A system comprising:
one or more shared computer processors; and
a memory containing a program, which when executed by the one or more shared computer processors, performs an operation comprising:
processing a first logical partition on at least one of the shared processors for the duration of a dispatch cycle for the first logical partition;
issuing, by a hypervisor, at a predefined time prior to completion of the dispatch cycle for the first logical partition, a lightweight hypervisor decrementer (HDEC) interrupt;
responsive to the lightweight HDEC interrupt, initiating an asynchronous hardware operation on the shared processor prior to completion of the dispatch cycle for the first logical partition;
averaging amounts of time required to perform the asynchronous hardware operation for each of a plurality of logical partitions, to determine an average amount of time; and
setting the average amount of time as the predefined time to issue the lightweight HDEC during the processing of the first logical partition.

7. The system of claim 6, the operation further comprising:
upon determining that a count of times the shared processor completes the asynchronous hardware operation prior to the completion of each respective dispatch cycle exceeds a predefined threshold, subtracting a fractional amount of time from the predefined time to cause the lightweight interrupt to be issued closer to the end of the dispatch cycle for the first logical partition.

8. The system of claim 6, the operation further comprising:
upon determining that a count of times the shared processor completes the asynchronous hardware operation after the completion of each respective dispatch cycle exceeds a predefined threshold, adding a fractional amount of time to the predefined time to cause the lightweight interrupt to be issued occur further from the end of the dispatch cycle for the first logical partition.

9. The system of claim 6, the operation further comprising:
upon completion of the dispatch cycle for the first logical partition, issuing, by the hypervisor, a hypervisor decrementer (HDEC) interrupt that causes a second logical partition to be processed by the shared processor for the duration of a next dispatch cycle.

10. The system of claim 6, wherein the asynchronous hardware operation is performed in order to facilitate a subsequent micropartition prefetch process by the first logical partition.

11. A computer program product, comprising:
a non-transitory computer-readable storage medium having computer code embodied therein that, when executed by a shared processor, performs an operation comprising:
processing a first logical partition on the shared processor for the duration of a dispatch cycle for the first logical partition;
issuing, by a hypervisor, at a predefined time prior to completion of the dispatch cycle for the first logical partition, a lightweight hypervisor decrementer (HDEC) interrupt;
responsive to the lightweight HDEC interrupt, initiating an asynchronous hardware operation on the shared processor prior to completion of the dispatch cycle for the first logical partition;
averaging amounts of time required to perform the asynchronous hardware operation for each of a plurality of logical partitions, to determine an average amount of time; and
setting the average amount of time as the predefined time to issue the lightweight HDEC during the processing of the first logical partition.

12. The computer program product of claim 11, the operation further comprising:
upon determining that a count of times the shared processor completes the asynchronous hardware operation prior to the completion of each respective dispatch cycle exceeds a predefined threshold, subtracting a fractional amount of time from the predefined time to cause the lightweight interrupt to be issued closer to the end of the dispatch cycle for the first logical partition.

13. The computer program product of claim 11, the operation further comprising:
upon determining that a count of times the shared processor completes the asynchronous hardware operation after the completion of each respective dispatch cycle exceeds a predefined threshold, adding a fractional amount of time to the predefined time to cause the lightweight interrupt to be issued occur further from the end of the dispatch cycle for the first logical partition.

14. The computer program product of claim 11, the operation further comprising:
upon completion of the dispatch cycle for the first logical partition, issuing, by the hypervisor, a hypervisor decrementer (HDEC) interrupt that causes a second logical partition to be processed by the shared processor for the duration of a next dispatch cycle.

\* \* \* \* \*